Dec. 16, 1924.
G. S. MOORE
TROLLEY
Filed Oct. 5, 1923
1,519,321
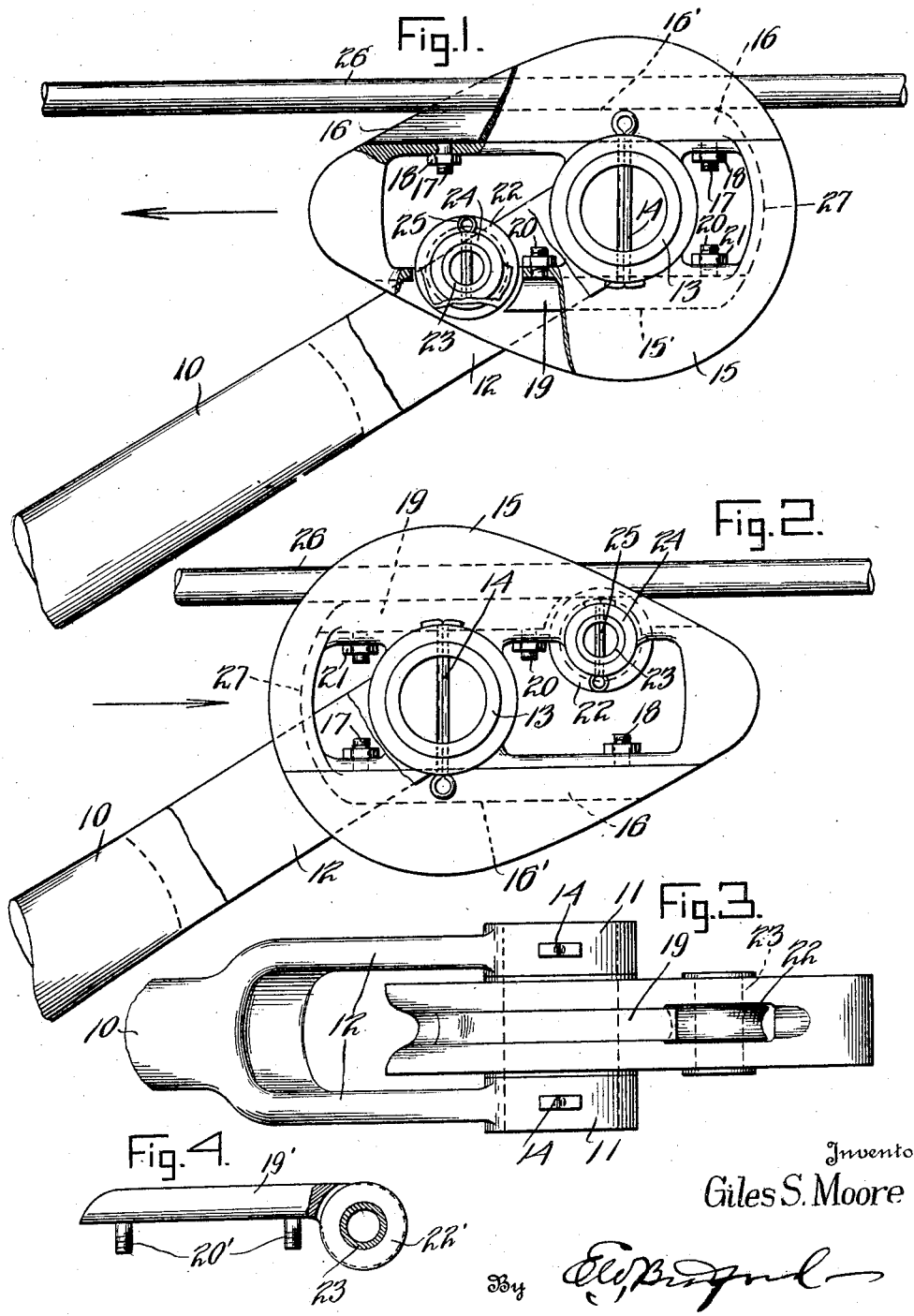
Inventor
Giles S. Moore
By
Attorney Patented Dec. 16, 1924.

1,519,321

UNITED STATES PATENT OFFICE.

GILES S. MOORE, OF INDIANAPOLIS, INDIANA, ASSIGNOR TO TROLLEY SHOE-WHEEL COMPANY, OF INDIANAPOLIS, INDIANA, A CORPORATION OF INDIANA.

TROLLEY.

Application filed October 5, 1923. Serial No. 666,785.

*To all whom it may concern:*

Be it known that I, GILES S. MOORE, a citizen of the United States, residing at Indianapolis, in the county of Marion and State of Indiana, have invented certain new and useful Improvements in Trolleys, of which the following is a specification.

My said invention relates to an improved trolley of the sliding shoe type and it is an object of the same to provide improved means whereby the car carrying the trolley can move backward as well as forward without throwing the trolley off the wire.

A further object is to provide improved means whereby the trolley, if it should leave the wire, will be prevented from damaging cross wires or their adjacent parts or the supporting devices for the wires. For this purpose the trolley is so constructed that when it leaves the wire it immediately moves from a horizontal position to a vertical position. It cannot catch in overhead structures so as to damage them or itself, this being partly due to the shape of the trolley whereby it can rotate as freely as a wheel would in the harp and partly to the fact that there are no positive steps preventing its rotation in either direction.

Another object is to provide an improved anti-friction wheel for use when the car is traveling backward.

Still another object is to provide improved removable wear parts on the trolley.

Referring to the accompanying drawings which are made a part hereof and on which similar reference characters indicate similar parts, Figure 1 is a side view of the trolley in the position assumed when the car is moving forward, Figure 2, a similar view showing the position assumed when the car is moving in the contrary direction, Figure 3, a plan of the trolley, and Figure 4, a modified detail.

In the drawings reference character 10 indicates a harp which may be of any desirable or conventional type, this harp having a journal 11 at each side of the outer end of forks 12. A hollow pin 13 is supported in the journals and is held in place by cotter pins 14. A bracket 15 is rotatably supported on the pin. This bracket has parallel wings at its sides, the body of the bracket between the wings being reduced along its side and ends to provide a slot for the wire. A removable tread 16 is secured to one side of the bracket, the tread having wings corresponding to those of the body and giving the device a generally oval form as viewed from either side. The dotted lines at 15' and 16' indicate the bottom of the slot for the trolley wire. The tread 16 is held in place by threaded projections 17 extending through openings in the horizontal face of the bracket and provided with nuts 18.

At the other side of the bracket there is a removable insert 19 which is shorter than the first named one and is held in place by threaded projections 20 and nuts 21. In front of the latter insert the bracket is cut through to provide a space for a roller 22 having flanges at opposite ends approximately in line with the sides of the insert 19. The roller 22 is journaled on a hollow pin 23 held in journals 24 integral with the bracket by means of cotter pins 25.

The removable tread section 16 as will be evident from the drawings contacts with the trolley wire 26 during the forward movement of the car and therefore receives the greatest amount of wear. This section can readily be detached by removing the nuts 18 and a new section substituted. When the movement of the car is reversed, the wire will travel over the track section 27 which is on the bracket itself and so to the removable insert 19, this insert cooperating with the roller 22 during the rearward movement. This roller is of importance in that the rolling contact traveling ahead of the sliding contact overcomes the resistance of the wire and the contact shoe and prevents the same from becoming excessive, the excessive resistance on backward movement having heretofore been a leading source of dissatisfaction with sliding control shoes. In this construction the shoe can no longer press itself against the wire in such a manner as to cause the pole to turn over by reason of the car backing underneath it. The groove or slot forming the bracket for the wire does not extend about the smaller end of the oval trolley for the reason that the wire ordinarily will not pass over this part of the trolley but as will be seen if the trolley should leave the wire it can revolve freely on its pin on striking overhead constructions so as to do no more damage than would a wheel in similar circumstances.

It should be noted that the device does not require a specially made harp but can be used with any of the conventional harps now in use.

It will be obvious to those skilled in the art that the insert might extend the full length of its contact face as does the retread and the roller might be mounted in journals on the insert as shown in Figure 4 where the part corresponding to the insert is shown at 19' and is provided with a pivot-pin 23' carrying a roller 22'. Pins 20' here shown as threaded serve to hold the device in place as above described. Many other modifications will also be apparent to those skilled in the art and therefore I do not limit myself to what is shown in the drawings and described in the specification, but only as indicated in the appended claims.

Having thus fully described my said invention, what I claim as new and desire to secure by Letters Patent, is:

1. A trolley comprising a harp, a pivot pin extending through the forks of the harp, a bracket on the pin freely rotatable with reference to the harp and having sliding contact faces at opposite sides of the pivot pin, and a removable wear shoe on each face having extensions cooperating with the bracket to hold the shoes in place, substantially as set forth.

2. A trolley comprising a harp, a pivot pin extending through the forks of the harp, a bracket on the pin freely rotatable with reference to the harp and having sliding contact faces at opposite sides of the pivot pin, a removable wear shoe at one end of one of said faces, and a roller at the other end also adapted to engage the wire, substantially as set forth.

3. A trolley comprising a harp, a pivot pin extending through the forks of the harp, a bracket on the pin freely rotatable with reference to the harp and having sliding contact faces at opposite sides of the pivot pin, and a roller forming a part of one of said contact faces, substantially as set forth.

4. In a trolley, a pivoted bracket having a sliding contact face at one side for engagement with the trolley wire when the device is moving in one direction and having at the other side a sliding contact face and a roller for engagement with the trolley wire when moving in the opposite direction the roller being then in the lead, substantially as set forth.

5. In a trolley, a bracket comprising a journal, approximately parallel contact faces at opposite sides of the journal, removable wear shoes on said contact faces, extensions carried by said wear shoes extending through parts of the bracket into openings in front and in rear of the journal, and means for securing said extensions in position, substantially as set forth.

6. In a trolley, a bracket comprising a journal, approximately parallel contact faces at opposite sides of the journal, apertures in the bracket between said contact faces, and removable wear shoes on the contact faces having means extending into said apertures for securing the shoes in place, substantially as set forth.

7. In a trolley, a bracket comprising a journal, approximately parallel contact faces at opposite sides of the journal, apertures in the bracket between said contact faces, removable wear shoes on the contact faces having means extending into said apertures for securing the shoes in place, and a roller at one side of the bracket also adapted to contact with the trolley wire said roller being removable through one of said apertures, substantially as set forth.

In witness whereof, I have hereunto set my hand and seal at Indianapolis, Indiana, this 28th day of September, A. D. nineteen hundred and twenty-three.

GILES S. MOORE. [L. S.]

Witnesses:
M. L. SHULER,
O. S. BOLING.